US012602439B2

(12) United States Patent
Shaw et al.

(10) Patent No.:  US 12,602,439 B2
(45) Date of Patent:       Apr. 14, 2026

(54) SEARCH EXPERIENCE MANAGEMENT SYSTEM

(71) Applicant: Yext, Inc, New York, NY (US)

(72) Inventors: Maxwell Shaw, New York, NY (US);
Maxwell Davish, Brooklyn, NY (US);
Michael Dunn, Arlington, VA (US)

(73) Assignee: YEXT, INC., New York, NY (US)

( * ) Notice: Subject to any disclaimer, the term of this patent is extended or adjusted under 35 U.S.C. 154(b) by 0 days.

(21) Appl. No.: 17/192,460

(22) Filed: Mar. 4, 2021

(65) Prior Publication Data

US 2022/0284064 A1      Sep. 8, 2022

(51) Int. Cl.
| | |
|---|---|
| *G06F 16/9535* | (2019.01) |
| *G06F 16/9532* | (2019.01) |
| *G06F 40/232* | (2020.01) |
| *G06N 5/04* | (2023.01) |
| *G06N 20/00* | (2019.01) |

(52) U.S. Cl.
CPC ...... *G06F 16/9535* (2019.01); *G06F 16/9532* (2019.01); *G06F 40/232* (2020.01); *G06N 5/04* (2013.01); *G06N 20/00* (2019.01)

(58) Field of Classification Search
CPC ............. G06F 16/9535; G06F 16/9532; G06F 40/232; G06N 20/00; G06N 5/04
See application file for complete search history.

(56) References Cited

U.S. PATENT DOCUMENTS

| | | | |
|---|---|---|---|
| 9,805,018 B1 | 10/2017 | Richfield | |
| 2004/0243568 A1 | 12/2004 | Wang et al. | |

| | | | | |
|---|---|---|---|---|
| 2006/0004713 | A1* | 1/2006 | Korte .................. | G06F 16/9536 |
| 2013/0282682 | A1 | 10/2013 | Batraski et al. | |
| 2015/0347519 | A1* | 12/2015 | Hornkvist ........... | G06F 16/2457 |
| | | | | 707/722 |
| 2017/0220692 | A1* | 8/2017 | Greenwood ........ | G06F 16/9535 |
| 2017/0316053 | A1 | 11/2017 | Lopiano | |
| 2018/0068031 | A1 | 3/2018 | Hewavitharana et al. | |
| 2019/0012390 | A1* | 1/2019 | Nishant .................. | G06N 3/006 |
| 2019/0251126 | A1* | 8/2019 | Joseph ................ | G06F 16/3329 |
| 2020/0034681 | A1* | 1/2020 | Carver .................. | G06N 5/041 |
| 2020/0210891 | A1* | 7/2020 | Safronov ............ | G06F 16/3349 |
| 2021/0026906 | A1 | 1/2021 | Reznik | |
| 2021/0191925 | A1 | 6/2021 | Sianez | |
| 2021/0334299 | A1* | 10/2021 | Sonntag ................ | G06F 40/263 |

(Continued)

OTHER PUBLICATIONS

PCT Notification of Transmittal Of The International Search Report And The Written Opinion Of The International Searching Authority for PCT Application No. PCT/US2022/018719 filed, mailed Jun. 24, 2022, 15 pages.

*Primary Examiner* — Courtney Harmon
(74) *Attorney, Agent, or Firm* — Jeffri A. Kaminski; Venable LLP

(57)                  ABSTRACT

A system and method to train one or more components of a search algorithm based on feedback received from a user system. The system and method provide, via an interface, a first search query comprising one or more terms and a first query response generated by a component of the search algorithm. The system and method receive, via the interface, a label corresponding to the query response. An override action is generated in view of the label. In response to a second query comprising the one or more terms, generating a second query response in accordance with the override action.

12 Claims, 10 Drawing Sheets

(56)           References Cited

U.S. PATENT DOCUMENTS

| | | | | |
|---|---|---|---|---|
| 2021/0406723 | A1* | 12/2021 | Hintz .................... | G06F 16/334 |
| 2022/0006760 | A1* | 1/2022 | Lopes de Moraes ... | G06F 16/35 |
| 2022/0035992 | A1* | 2/2022 | Bikumala ............ | G06Q 30/016 |
| 2022/0043976 | A1* | 2/2022 | Picinini .............. | G06F 16/9538 |
| 2022/0100756 | A1* | 3/2022 | Bodigutla ................ | G06N 3/08 |
| 2022/0138170 | A1* | 5/2022 | Misiewicz ........... | G06N 3/0454 |
| | | | | 707/737 |

* cited by examiner

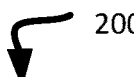

200

Provide, via an interface of a user system, a first search query including one or more terms and a corresponding query response generated by component of a search algorithm
210

Receive, from the user system, a label corresponding to the query response
220

Generate an override action in view of the label
230

Generate, in response a second query including the one or more terms, a query response in accordance with the override action
240

SEARCH TRAINING INTERFACE

Component Type 1 – Query/response example 1

Component Type 1 – Query/response example

How does zells work

Did you mean: *How does zell work*  406

Zelle  412

Save

Home    Knowledge Graph    Listings    Pages    Search    Reviews    Analytics    Applications

SEARCH TRAINING INTERFACE
Training Log

| Label | Component Type | Query Search Term(s) | Query Response | Revision | User | Date |
|---|---|---|---|---|---|---|
| Revised | Component Type 1 | How does zellss work | zelles | Zelle | J. Doe | 01/01/XX |
| Revised | Component Type 2 | ABC | response X | Revision 1 | J. Doe | 02/02/XX |
| Approved | Component Type 3 | DEF | response Y | N/A | J. Doe | 03/07/XX |
| Revised | Component Type 1 | GHI | response Z | Revision 2 | J. Doe | 01/01/XX |
| Approved | Component Type 1 | JKL | response P | N/A | A. Smith | 01/01/XX |
| Approved | Component Type 1 | MNO | response Q | N/A | A. Smith | 01/01/XX |
| Revised | Component Type 2 | QRS | response R | Revision 4 | A. Smith | 02/02/XX |
| Revised | Component Type 3 | APZ | response S | Revision 5 | A. Smith | 03/07/XX |
| Rejected | Component Type 1 | BTN | response T | N/A | J. Doe | 09/09/XX |
| Approved | Component Type 1 | JKL | response U | N/A | A. Smith | 2/14/XX |

FIG. 6

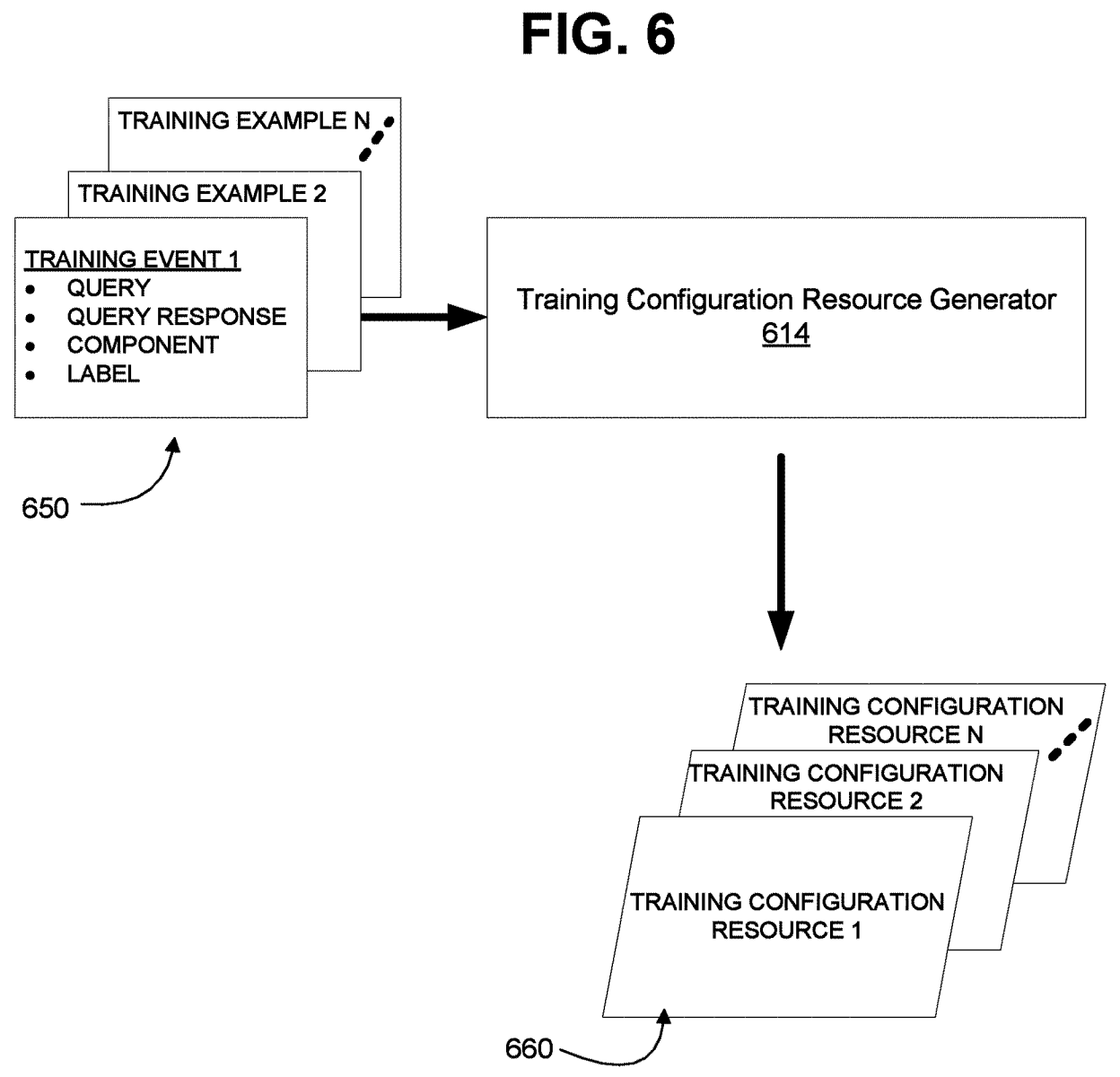

Training Configuration Resource Generator
614

TRAINING EXAMPLE N

TRAINING EXAMPLE 2

TRAINING EVENT 1
- QUERY
- QUERY RESPONSE
- COMPONENT
- LABEL

650

TRAINING CONFIGURATION RESOURCE N

TRAINING CONFIGURATION RESOURCE 2

TRAINING CONFIGURATION RESOURCE 1

Figure 7:
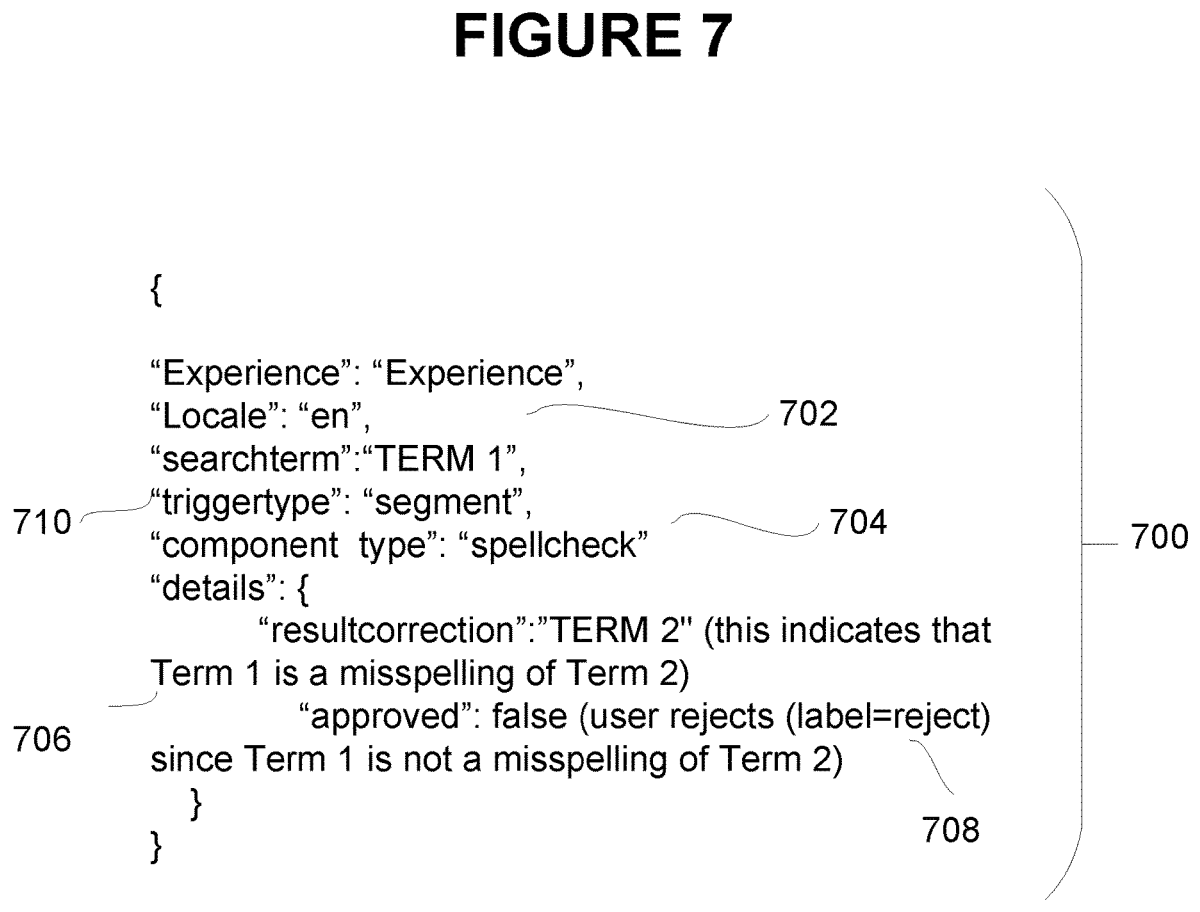

"Experience": "Experience",
    "Locale": "en",                          702
    "searchterm":"TERM 1",
    "triggertype": "segment",
    "component type": "spellcheck"           704

700
    "details": {
            "resultcorrection":"TERM 2" (this indicates that
    Term 1 is a misspelling of Term 2)
                    "approved": false (user rejects (label=reject)
    since Term 1 is not a misspelling of Term 2)

}
    }
```

710

706

708

SEARCH EXPERIENCE MANAGEMENT SYSTEM

TECHNICAL FIELD

The disclosure relates generally to a knowledge search platform, and more particularly to training of a search platform to enable generation of improved search results.

BACKGROUND

Many companies (e.g., merchants) employ electronic systems to provide information about the company to consumers (e.g., end-users) in an electronic environment. For example, a web-based search system may be provided to receive search queries from end-user systems and generate corresponding search results for consumption by the end-user systems. In this regard, the end-users may use a search engine to obtain merchant-related information published and accessible via a network (e.g., the Internet). Search engines are software programs that search databases, and collect and display information related to search terms specified by an end-user.

The quality (e.g., responsiveness and accuracy) of the search response is critically important to the merchant. For example, a "bad" or low-quality search result or prediction generated by a search algorithm produces a bad search experience for both the end-user and the merchant. In such instances, it is advantageous for the company to have a mechanism to identify low-quality search results that are being generated by the search engine and have a mechanism to correct or improve those search results for responding to future end-user search queries.

Conventional approaches for a company to provide feedback regarding search results generated by a search algorithm involve the use of submissions (e.g., forms or tickets) that a user associated with the merchant can generate and provide to a search provider for potential adjustments to the search algorithm. However, these submissions can be time-consuming and labor-intensive for a merchant to prepare and submit to the search algorithm manager. Furthermore, the information included in these submissions frequently lack specificity as to the nature of the quality issue associated with a search query and corresponding search result. This lack of specificity makes it difficult for a search algorithm manager to identify the underlying problem and take a remedial action. Moreover, a search algorithm manager can receive a large number of such submissions that require significant time to process and respond to (e.g., make a corresponding change or modification to the search algorithm in respond to a merchant's feedback). During this extensive processing time, the search algorithm continues to produce the low-quality search results in response to many additional search queries that are in need of improvement in accordance with pending submissions.

BRIEF DESCRIPTION OF THE FIGURES

The present disclosure will be understood more fully from the detailed description given below and from the accompanying drawings of various implementations of the disclosure.

FIG. 2 is a flow diagram of an example method of training a component of a search algorithm by a search algorithm management system, according to embodiments of the present disclosure.

FIG. 5 illustrates an example of a second interface type associated with training one or more components of a search algorithm, according to embodiments of the present disclosure.

FIG. 6 illustrates an example training configuration resource generator of a search algorithm management system show example interfaces relating to management of analytics by a knowledge search system, according to embodiments of the present disclosure.

FIG. 7 illustrates an example of a portion of a training configuration resource generated and managed by a search algorithm management system, according to embodiments of the present disclosure.

DETAILED DESCRIPTION

Figure 1:
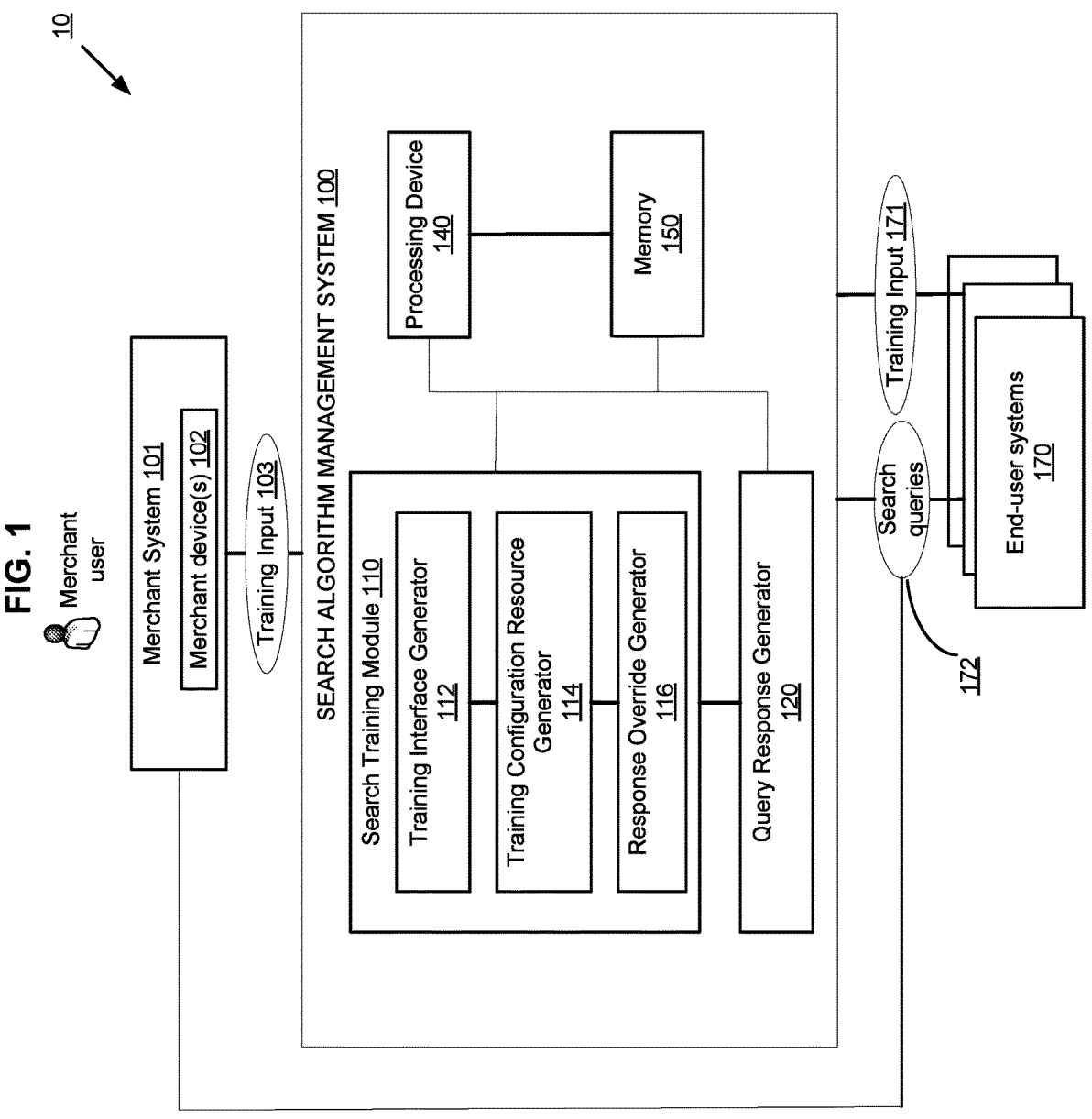
FIG. 1 illustrates an example environment that includes a search algorithm management system, according to embodiments of the present disclosure.

To identify relevant data with respect to a search query received from an end-user (e.g., a user initiating a search via a web interface), a search engine executes a search algorithm to generate and provide a corresponding search response. The search algorithm can include a set of computer-implementable instructions executable to retrieve information stored in a data structure for provisioning search results in response to a search query. In an embodiment, a search algorithm can have many different parts or components that enable the execution of a search as part of a search experience corresponding to an end-user system (e.g., a system associated with an end-user submitting a search query) and a merchant (e.g., a company or entity for which the end-user system is seeking information in accordance with the search query). For example, the search algorithm can include components such a spell check component configured to generate an accurate spelling correction associated with a search query, a natural language processing (NLP) filtering component configured to infer or identify a correct NLP filter search results based on processing of a meaning and context of one or more words or phrases of a search query, and a direct response or "direct answers" component configured to provide a direct response to a search query.

In an embodiment, a search experience management system is provided to enable a user (e.g., a user associated with a merchant system, an end-user such as a customer, etc.) to provide input or feedback to train the one or more components of the search algorithm. In an embodiment, the search experience management system provides component-level training of the search algorithm to allow a user to provide training-related feedback regarding isolated or individual component of the search algorithm. Advantageously, this component-level training feedback enables tailored training and tuning of individual components of the search algorithm by a merchant user to produce high quality search results relating to a merchant in response to search queries.

In an embodiment, the search algorithm management system may provide an interface to an end-user system (e.g., a customer or other user submitting a search query for information about a merchant) to enable the end-user to provide feedback related to a search result provided in response to the search query. In an embodiment, the search algorithm management system can capture the end-user feedback (e.g., a thumbs up or thumbs down indication relating to a response to a search query) and use the end-user feedback to train the one or more components of the search algorithm.

The search algorithm management system manages a search algorithm that is executable via one or more search engines or search provider systems to provide search results in response to a search query received from one or more end-user systems. In an embodiment, the search algorithm can conduct a keyword search based on text data provided by the end-user. In conducting the search, the end-user seeks to identify search results (e.g., in the form of a web element such as a webpage) that is responsive to the search query (e.g., one or more keywords or phrases inputted by an end-user). If one or more keywords are incorrect (e.g., incomplete, include a typographical error, misspelled, etc.) or not indexed by the search engine, the information the end-user seeks may not be identified or discovered in response to the query. Furthermore, if the search algorithm applies an incorrect NPL filter or identifies an incorrect direct response, a low quality search result can be produced. In other situations, the requested information responsive to the user query may not be found due to a gap (e.g., a lack of content) between the keywords of the end-user's query and the data associated with the merchant stored in a corresponding data structure. As result, the generation of inaccurate or low quality search results relating to a merchant can cause the provisioning of incorrect information and/or cause the end-user to abandon the search effort before obtaining the desired information, which can result in a lost business opportunity for the merchant associated with the search query.

Embodiments of the disclosure address the above-mentioned problems and other deficiencies with conventional search technologies by providing a search algorithm management system that enables a user (e.g., a user associated with a merchant system, also referred to as a "merchant user" or an end-user associated with an end-user system, such as a customer or other user searching for information associated with a merchant) to provide inputs or feedback to train one or more components of a search algorithm to produce desired high quality search results. In an embodiment, the feedback or input (also referred to as "training input") can be provided at a component-level of the search algorithm. In an embodiment, the training input can be processed by the search algorithm management system relating to an individual component of the search algorithm (e.g., a spell check component, NPL filter component, or direct response component). Advantageously, the training of the search algorithm at the component-level increase the efficiency and accuracy of the training, as compared to conventional approaches that rely on feedback regarding whether an algorithm as a whole provided a quality result.

In an embodiment, the search algorithm management system provides interfaces to a merchant user (i.e., a user operating on behalf of a business entity) to enable the merchant user to both proactively and reactively provide component-level feedback to be used by the search algorithm management system to train one or more machine-learning models corresponding to a respective algorithm component. This enables the search results relating to a merchant to be tuned and improved by component-level training of the search algorithm.

FIG. 1 illustrates an example environment 10 including a search algorithm management system 100 operatively coupled to one or more merchant systems 101. In one embodiment, the search algorithm management system 100 enables a user (herein referred to as a "merchant user") operating a communicatively connected merchant device 102 on behalf of the merchant system 101 to provide inputs to train one or more components of a search algorithm configured to provide search results relating to a merchant in response to search queries 172 received from end-user systems 170 in accordance with one or more aspects of the disclosure.

According to embodiments, the search algorithm management system 100 includes modules configured to perform various functionality, operations, actions, and activities, as described in detail herein. In an embodiment, the search algorithm management system 100 includes a search training module 110 and a query response generator 120. In an embodiment, the search training module 110 is configured to train individual components of the search algorithm that is executed by the query response generator 120 to generate search results in response to the search queries 172. In an embodiment, the search algorithm that is trained by the search training module 110 includes multiple components. In an embodiment, a search algorithm component includes an individual portion of the search algorithm (e.g., a portion of the set of instructions of the search algorithm) configured to a particular aspect of a search experience. In an embodiment, the search algorithm can include a spell check component configured to perform spell checking and correcting features of the search algorithm, an NLP filtering component configured to identify and apply NPL filters to a search query, and a direct response (or "direct answers") component configured to identify an applicable direct answer corresponding to a search query. It is noted that although the examples described herein relate to the aforementioned components, the search algorithm can include other or additional components.

In an embodiment, the search training module 110 is configured to enable each of the individual components of the search algorithm to be trained based on interactions with the merchant system 101. In an embodiment, the search training module 110 can include a training interface generator 112, a training configuration resource generator 114, and a response override generator 116, as described in detail herein. In an embodiment, the modules may be executed on one or more computer platforms of the search algorithm management system 100 that are interconnected by one or more networks, which may include the Internet. The modules may be, for example, a hardware component, circuitry, dedicated logic, programmable logic, microcode, etc., that may be implemented by a processing device 140 executing instructions stored by the memory 150 of the search algorithm management system 100.

In an embodiment, the training interface generator 112 enables operative coupling with the merchant system 101 and one or more end-user systems 170 to generate and manage communications relating to the training of the components of the search algorithm. In an embodiment, the training interface generator 112 is configured to provide access to the merchant system 101 to the features and functions of the search algorithm management system 100 via one or more graphical user interfaces configured for display via one or more merchant device 102 of the merchant system 101. In an embodiment, the training interface generator 112 is configured to enable communications with the merchant system 101 relating to the collection of training input 103.

In an embodiment, the training interface generator 112 is configured to provide access to the one or more end-user systems 170 to one or more features and functions of the search algorithm management system 100 via one or more graphical user interfaces configured for display via one or more end-user devices. In an embodiment, the training interface generator 112 is configured to enable communications with the end-user system 170 via in accordance with one or more training interface types to enable the collection of training input 171 from the one or more end-user systems 170 via in accordance with one or more training interface types.

In an embodiment, the training interface generator 112 is configured to generate a first training interface type to collect the training input 103, 171, including feedback and inputs from a merchant system 101 and/or end-user system 170 relating to one or more search queries and search results. In an embodiment, the first training interface type (also referred to as a "proactive training interface" or "experience training interface") provides one or more displays (e.g., a display workflow) configured to collect inputs (e.g., feedback) from a merchant system 101 relating to one or more components of the search algorithm.

In an embodiment, the first interface type can present a display portion or "card" including an actual (e.g., historical) search query and a corresponding response generated by a component of the search algorithm. In an embodiment, the first interface type can present a card including a hypothetical or system-generated search query and a response that would be generated by a component of the search algorithm. In an embodiment, the first interface type is configured to receive a label from the merchant system relating to the search query and provisioned response. In an embodiment, the label represents a rating or other indication associated with the response that can be used to train the component of the search algorithm that produced the response. In an embodiment, the label can include an indication representing an approval of the response (also referred to as an "approve label", a rejection of the response (also referred to as a "reject label"), or a revision of the response (also referred to as a "revise label"). In an embodiment, the interface includes multiple interactive portions (e.g., icons, symbols, links, etc.) corresponding to multiple different labels that are selectable by the merchant system (e.g., via an interaction with an interactive portion corresponding to the desired label).

In an embodiment, the training interface generator 112 dynamically generates a list of search query and response pairs to present to the merchant system 101 for the collection of a label. In an embodiment, the list of search query and response pairs can be ranked in terms of popularity or in terms of a level of attention that is needed during the training phase (e.g., a ranked list with a set of query and response pairs having a highest level of uncertainty at a top of the list to enable a prioritized capturing of training feedback. In an embodiment, the training interface generator 112 identifies and collects the labels corresponding to each of the one or more query/response pairs on the list (also referred to as a "task queue"). An example of the first interface type is described in greater detail below in connection with FIGS. 3 and 4.

In an embodiment, the search algorithm management system 110 can maintain a training log including information relating to previous or historical training events that were previously processed by the search algorithm management system 100. In an embodiment, the search algorithm management system 100 can generate one or more display portions associated with the training log for review by the merchant system. In an embodiment, the training log includes one or more data structures (e.g., a tables) which presents information including, but not limited to, a list of search query examples, a corresponding component type (e.g., spell check, NPL filter, direct response, etc.), an original search result (e.g., the search result that was generated in response to the actual search query by the corresponding component of the search algorithm), information identifying a merchant user associated with the training event, a date of the training event, and a revision or correction of the search result based on a label (e.g., training feedback) from the merchant system (if applicable). An example of a training log is described in greater detail below in connection with FIG. 5.

In an embodiment, the training interface generator 112 is configured to generate a second training interface type to collect feedback and inputs from a merchant system 101 relating to one or more search queries and search results. In an embodiment, the second training interface type (also referred to as a "reactive training interface" or "search log detail interface") provides one or more displays (e.g., a display workflow) configured to collect inputs (e.g., feedback) from a merchant system 101 relating to one or more components of the search algorithm.

In an embodiment, the training configuration resource generator 114 generates a resource (e.g., a file) corresponding to the one or more training events (e.g., a search query, response, and feedback (e.g., label) corresponding to a component of the search algorithm). In an embodiment, the training configuration resource generator can generate a resource in accordance with a schema to structure the data or information relating to each training event or example processed by the search algorithm management system 100. In an embodiment, the training configuration resource generator 114 is configured to generate a resource (e.g.,) for each training event processed by the search algorithm management system 100. The training configuration resource generator 114 is described in greater detail below with respect to FIG. 6. In an embodiment, a single schema may be employed in connection with training events corresponding to the multiple different search algorithm components. An example of a portion of a training configuration resource including an example schema is described in greater detail below in connection with FIG. 7.

In an embodiment, the response override generator 116 processes an override action corresponding to one or more training configuration resources generated in response to training feedback received from the merchant system 110. In an embodiment, each time a training event is presented to a merchant user and an indication associated with a reject label or revise label, the response override generator 116 identifies a corresponding override action. In an embodiment, an override action includes information associated with an override corresponding to a search response generated by a component of the search algorithm. In an embodiment, the response override generator 116 can process an override action corresponding to feedback received from one or more end-user systems (e.g., systems associated with end-users such as customers). In an embodiment, the end-user system 170 can provide negative training inputs (e.g., a set of "thumbs down" indications) that, if the negative training inputs exceed a threshold level (e.g., greater than 50 thumbs down indications corresponding to a search result), the response override generator 116 can generate a corresponding override action.

In an example, if a first merchant system (e.g., McDonald's™) in a particular vertical (e.g., fast food restaurants) provides a training input that results in an override action, the override action can be stored and applied to other merchant systems (e.g., Burger King™) within the same vertical. In an embodiment, an override action associated with a search query processed in accordance with training inputs from a first merchant system can be applied to a second merchant in connection with the same search query (e.g., the override action can be applied to one or more other merchant systems for the same query).

In an embodiment, the query response generator 120 is configured to generate a response to a search query 172 received from an end-user system 170. In an embodiment, the query response generator 120 is communicatively coupled to the response override generator 116 and can check whether there is an override action corresponding to the search query 172. In an embodiment, the query response generator 120 identifies a component of the search algorithm to use to generate the search response. In an embodiment, the query response generator 120 checks a data store (e.g., a cache, also referred to as an "override cache") to determine whether the response override generator 116 generated an override action corresponding to the search query and search algorithm component. In an embodiment, the override action identifies feedback received from the merchant system associated with at least a portion of the received search query (e.g., one or more words or phrases of the search query) which indicates the search response generated by the identified component of the search algorithm is to be overridden. For example, if the search query is associated with an override action based on a corresponding reject label or revise label associated with a generated search response, the response override generator 116 can generate an instruction to the query response generator 120 to override the generated search response. Advantageously, based on training feedback received from a merchant system 101, the search algorithm management system 100 can take remedial action (e.g., override a search result generated by an algorithm component in response to a search query from an end-user system 170) as it relates to the generation and provisioning of search results in response to a search query.

According to embodiments, the search algorithm management system 100 can employ one or more artificial intelligence (AI)-based approaches such as machine learning techniques or systems to train the components of the search algorithm in accordance with the training events processed by the search training module 110. In an embodiment, the machine learning system can include one or more trainable models that are trained in accordance with one or more learning systems (e.g., a supervised learning system, an unsupervised learning system, a reinforcement learning system, a deep learning system, a neural network (e.g., recurrent neural network, recursive neural network, convolutional neural network, etc.), etc.) In an embodiment, the search training module 110 can use the training configuration resources generated for the respective training events (e.g., training examples) to train one or more models of the machine learning system to train the components of the search algorithm to produce improved search results.

In an embodiment, the one or more models maintained by the search algorithm management system 100 can be trained by assigning one or more labels to training inputs for use in determining whether a training input is to be used to train a "global" AI model. In an embodiment, a training input can be labeled as "good" or "accepted" and further processed to train one or more AI-based models. In an embodiment, the one or more AI-based models can be retrained automatically on a periodic basis (e.g., nightly) based on all the data the search algorithm management system has accumulated (e.g., a historical set of training data). In an embodiment, based on the results of one or more automated tests, a determination is made whether to deploy a trained model to production.

In an embodiment, the search algorithm management system 100 is operatively coupled to the one or more merchant systems 101 and the one or more end-user systems 170 via a suitable network (not shown), including, for example, the Internet, intranets, extranets, wide area networks (WANs), local area networks (LANs), wired networks, wireless networks, or other suitable networks, etc., or any combination of two or more such networks. In one embodiment, the search algorithm management system 100 includes the processing device 140 and a memory 150 configured to execute and store instructions associated with the functionality of the various components, services, and modules of the search algorithm management system 100, as described in greater detail below in connection with FIGS. 1-8.

In one embodiment, the merchant system 101 may include one or more components of the search algorithm management system 100. In this embodiment, the merchant system 101 and the search algorithm management system 100 may be integrated such that the merchant system 101 employs the search algorithm management system 100 and its related functionality to training components of the search algorithm to produce higher quality responses to one or more search queries 172 received from a communicatively connected end-user system 170. According to embodiments of the present disclosure, as shown in FIG. 1, an end-user system 170 may submit a search query 172 to the merchant system 101 (wherein the merchant system 120 is integrated with the search algorithm management system 100) and/or submit a search query 172 associated with the merchant system 120 to a third party web-based system configured to execute the search algorithm managed and trained by the search algorithm management system 100.

The merchant, via the merchant system 101, may use the search algorithm management system 100 to manage its data (also referred to as "merchant data") provisioning by the respective components of the search algorithm managed by the search algorithm management system 100. In an embodiment, the merchant system 101 can use the search algorithm management system 100 to train the components of the search algorithm to enable the generation of higher quality responses to search queries associated with the merchant. In that regard, the merchant system 101 can exercise control over the search algorithm-generated data associated with the merchant that is being returned to the end-user system 100.

In some embodiments, the merchant system 101 can include one or more modules (e.g., APIs) with which the search algorithm management system 100 interacts for carrying out operations associated with training the search algorithm components for providing relevant merchant data to the end-user systems 170. For example, the merchant system 101 and business listing provider systems 180 may include APIs to access one or more prescribed databases dedicated to storing information (e.g., merchant data) regarding the products, services, employees, events, etc. of a particular merchant. In other embodiments, the search algorithm management system 100 may include a database storing all or a portion of the merchant data. For example, the search algorithm management system 100 may include one or more prescribed databases dedicated to storing the information related to the merchant data.

In an embodiment, the training interface generator 112 can generate multiple different interface types to capture training inputs associated with training multiple different aspects of the components of the search algorithm. For example, an interface type can be generated that displays search results that are shown to an end-user system in response to a query. In an embodiment, another interface type can be generated to display the one or more suggestions that were provided to an end-user system as the query is being typed (e.g., spell correction suggestions). For example, let's say for a first merchant (e.g., McDonald's™), an end-user system (e.g., a customer) submits the following query "how many calories in a "Big Max?" In this example, a spelling correction suggestion is provided that attempts to correct the spelling in the query to "Big Mak". In an embodiment, the training interface generator can generate an interface to present the query and associated spelling correction result to enable a merchant system to provide training input or feedback related to the suggestion. In this example, the merchant system can provide a training input indicating a rejection of the "Big Mak" suggestion, and provide a training input indicating the response is to be replaced with "Big Mac". Accordingly, in this example, if an end-user system submits a subsequent query including the search term "Big Max", the search algorithm management system 100 can generate a response including a suggestion such as "Do you mean "Big Mac"?". In an embodiment, if an end-user system submits a subsequent query including the search term "Big Max", the search algorithm management system 100 can generate a response including search results corresponding to "Big Mac" (e.g., the term corresponding to the override action based on the previous training input).

FIG. 2 illustrates a flow diagram illustrating an example process 200 including steps performed by a search algorithm management system (e.g., search algorithm management system 100 of FIG. 1) communicatively connected with a developer user, according to embodiments of the present disclosure. The process 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In operation 210, the processing logic (e.g., processing logic of the search algorithm management system 100 of FIG. 1) provides, via an interface of a user system (e.g., a merchant system 101 of FIG. 1), a first search query comprising one or more terms and a corresponding query response generated by a component of a search algorithm. In an embodiment, the first query can be query received from an end-user system (e.g., end-user system 170 of FIG. 1) that was previously processed by the component of the search algorithm to generate the query response.

According to embodiments, the component of the search algorithm can include a spell check component, an NPL filtering component, or a direct response component. Each of the components can be separately and independently trained and tuned based on feedback received from the merchant system, as described herein.

Figure 3:
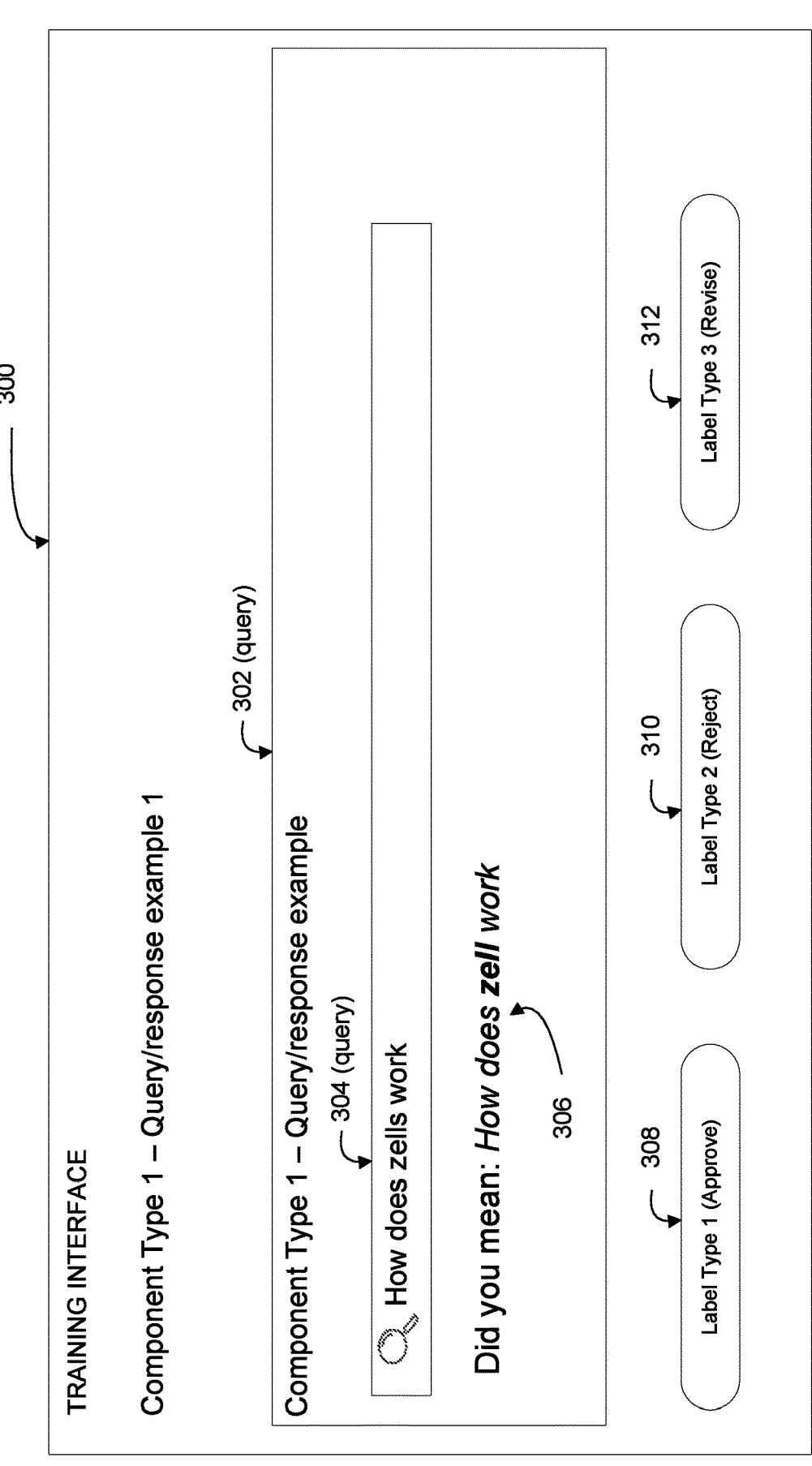
FIGS. 3 and 4 illustrate examples of an interface having an interface type associated with training one or more components of a search algorithm, according to embodiments of the present disclosure.

In an embodiment, the interface presented to the merchant system can be configured as a first interface type or a second interface type. FIG. 3 illustrates an example of a first interface type of a training interface 300 including an example card 302 presenting a query 304 and response 306 generated by a component (e.g., component type 1) of a search algorithm. In this example, the component type 1 includes a spell check component of the search algorithm. It is noted that the first interface type can be used to display information (e.g., cards) associated with other component types, such as an NPL filter component or a direct response component.

In the example shown in FIG. 3, the card 302 relates to an actual or historical query 304 as received from an end-user and the actual response 306 generated by the spell check component of the search algorithm. In this example, the query 304 included a term "zells" and the search response 306 includes the expression "Did you mean: How does zell work", wherein the term "zell" is identified by the spell check component as a correction for the search term "zells".

In an embodiment, the training interface generator 112 of FIG. 1 generates the training interface (e.g., interface 300 of FIG. 3) for display to the merchant system to collect feedback and inputs from a merchant system 101 relating to one or more search queries and search results. In an embodiment, the first training interface type (also referred to as a "proactive training interface") provides one or more displays (e.g., a display workflow) configured to collect inputs (e.g., feedback) from a merchant system 101 relating to one or more components of the search algorithm.

In an embodiment, the training interface 300 can present multiple different cards corresponding to different query and response examples (e.g., including query/response pairs associated with different component types) to the merchant system to obtain the training feedback. In an embodiment, the cards of the proactive training interface can be presented in a gamified manner, to facilitate and expedite the collection of training feedback from the merchant system. In an embodiment, the one or more cards are dynamically generated based on a task queue or list of search query and query response pairs to present to the merchant system for the collection of a label.

FIG. 5 illustrates an example of a display 500 including an example training log configured to include data relating to a set of training events (e.g., example query and response pairs that have been previously trained). In an embodiment, the training log includes a searchable, sortable, and filterable list of historical training data relating to one or more different component types. For example, the training log can include information relating to all of the component types (e.g., component type 1, component type 2, and component type 3, as shown in FIG. 5). As shown, the training log includes a set of information relating to the training events including, for example, query search terms, the query response initially generated by the corresponding component of the search algorithm, the label that was assigned to the query during a prior training exercise, a revision identified in connection with the initially generated query response, a user (e.g., merchant user) associated with the training event, a date of the training event.

Advantageously, the training log includes the one or more query terms and whether the prediction (e.g., the query response) generated by the corresponding component of the search algorithm was approved, rejected or revised (e.g., the label) in a centralized, comprehensive interface for review by the merchant user. In this regard, the training log presents the results of the one or more training events that are being processed to train the respective components of the search algorithm as it relates to the search experiences of end-users it relates to the merchant data. In addition, the training log centralizes and persists the information relating to training events as processed via the first interface type (as described in connection with FIGS. 3 and 4), which may otherwise be ephemeral and non-persistent across merchant user sessions.

In an embodiment, the processing logic can generate a second interface type (referred to as a "search log detail" or "query detail" interface) to enable a merchant system to operate in a reactive mode to identify a particular query and query response pair that is incorrect and requires attention and potential correcting or fixing. In an embodiment, the query detail interface enables a merchant user to input a particular query (e.g., one or more search terms) and review the query response generated by one or more of the components of the search algorithm. For example, the merchant system may enter the query "ABC" using the query detail interface. In response, the processing logic generates a first query response as generated by a first component of the search algorithm (e.g., a spell check component), a second query response as generated by a second component of the search algorithm (e.g., an NPL filter component), a third query response as generated by a third component of the search algorithm (e.g., a direct response component), and so on. In an embodiment, each of the component-level query responses can be provided to the merchant system and processed as a training event.

Figure 8:
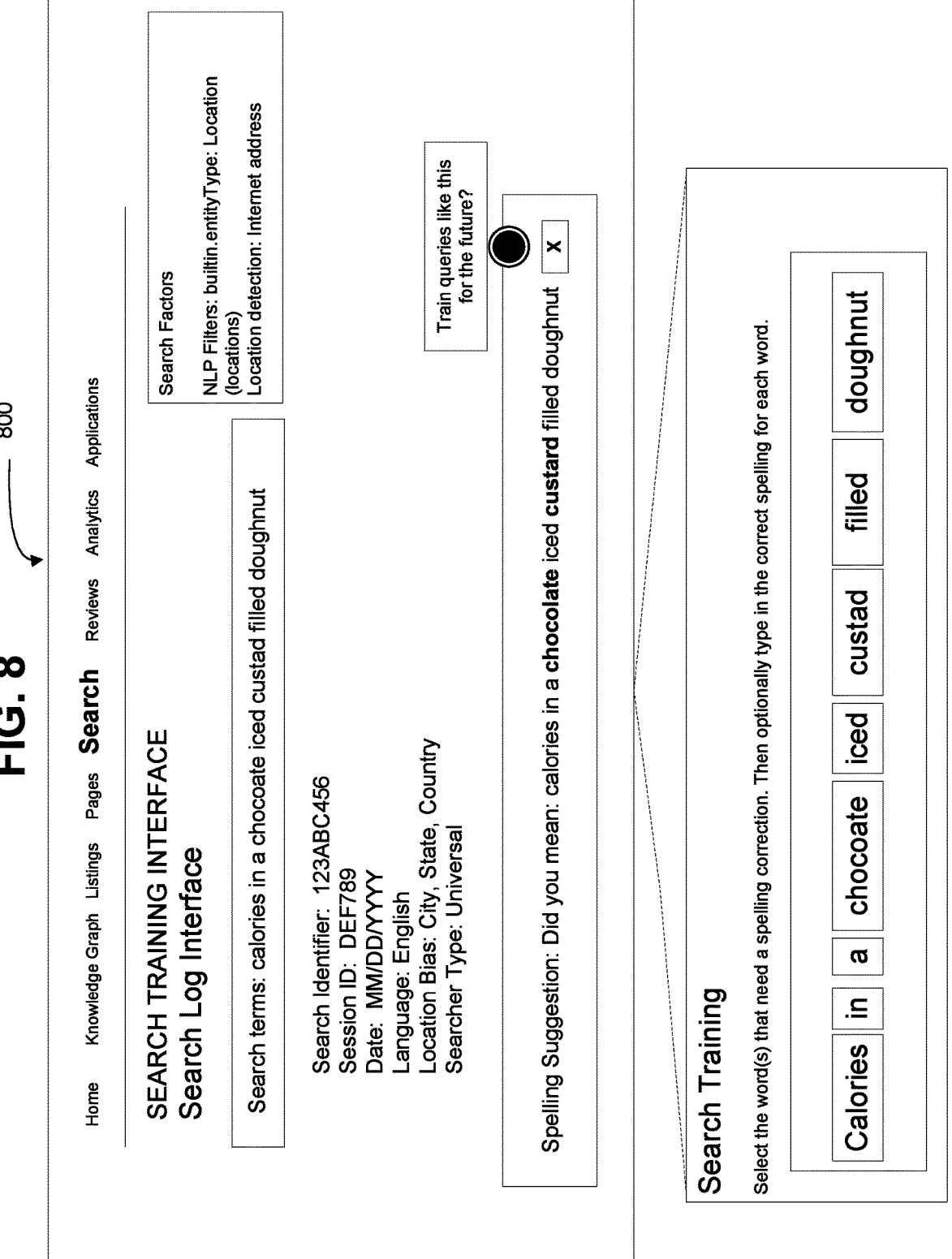
FIG. 8 illustrates an example of an interface having an associated interface type associated with training one or more components of a search algorithm, according to embodiments of the present disclosure.

FIG. 8 illustrates an example of an interface 800 having the second interface type (e.g., a search log detail interface). As shown, the search log detail interface 800 enables a user to enter a query including search terms and review the system-generated response. In an embodiment, the user can provide feedback regarding the response, including any desired changes (e.g., spelling correction feedback).

In an embodiment, the processing logic of the search algorithm management system can generate component-specific query responses for a particular query to enable a merchant system to review the responses and provide feedback (e.g., a label). Advantageously, this enables the training of the components of the search algorithm using one or more particular queries (e.g., queries that the merchant system would like to review and address as potentially inaccurate or incorrect) that may not appear in the task queue for surfacing via the first interface type, as described above.

In operation 220, the processing logic receives, via the interface, a label corresponding to the query response. In an embodiment, the label is received as an input (e.g., an electronic indication) from the merchant system which represents feedback that is used to train the corresponding component of the search algorithm. In an embodiment, the label represents a rating or other indication associated with the query response (e.g., query response 306 of FIG. 3) that can be used to train the component of the search algorithm that produced the response. In an embodiment, the label can include an indication representing an approval of the response (also referred to as an "approve label", a rejection of the response (also referred to as a "reject label"), or a revision of the response (also referred to as a "revise label").

In an embodiment, the label can be collected using the first interface type (e.g., the reactive mode) or the second interface type (e.g., the proactive mode). In an embodiment, in the reactive mode, the training interface generator 112 dynamically generates a list of search query and response pairs to present to the merchant system 101 for the collection of a label. In the example shown in FIG. 3, the training interface 300 includes three label types: label type 1 corresponding to an "approve" label 308; label type 2 corresponding to a "reject" label 310; and label type 3 corresponding to a "revise" label 312. In an embodiment, selection of the approve label 308 indicates that the merchant system approves the spell check response (e.g., correcting the term "zells" to "zell") as provided by the spell check component of the search algorithm. In an embodiment, selection of the reject label 310 indicates that the merchant system rejects the spell check response (e.g., correcting the term "zells" to "zell") as provided by the spell check component of the search algorithm.

Figure 4:
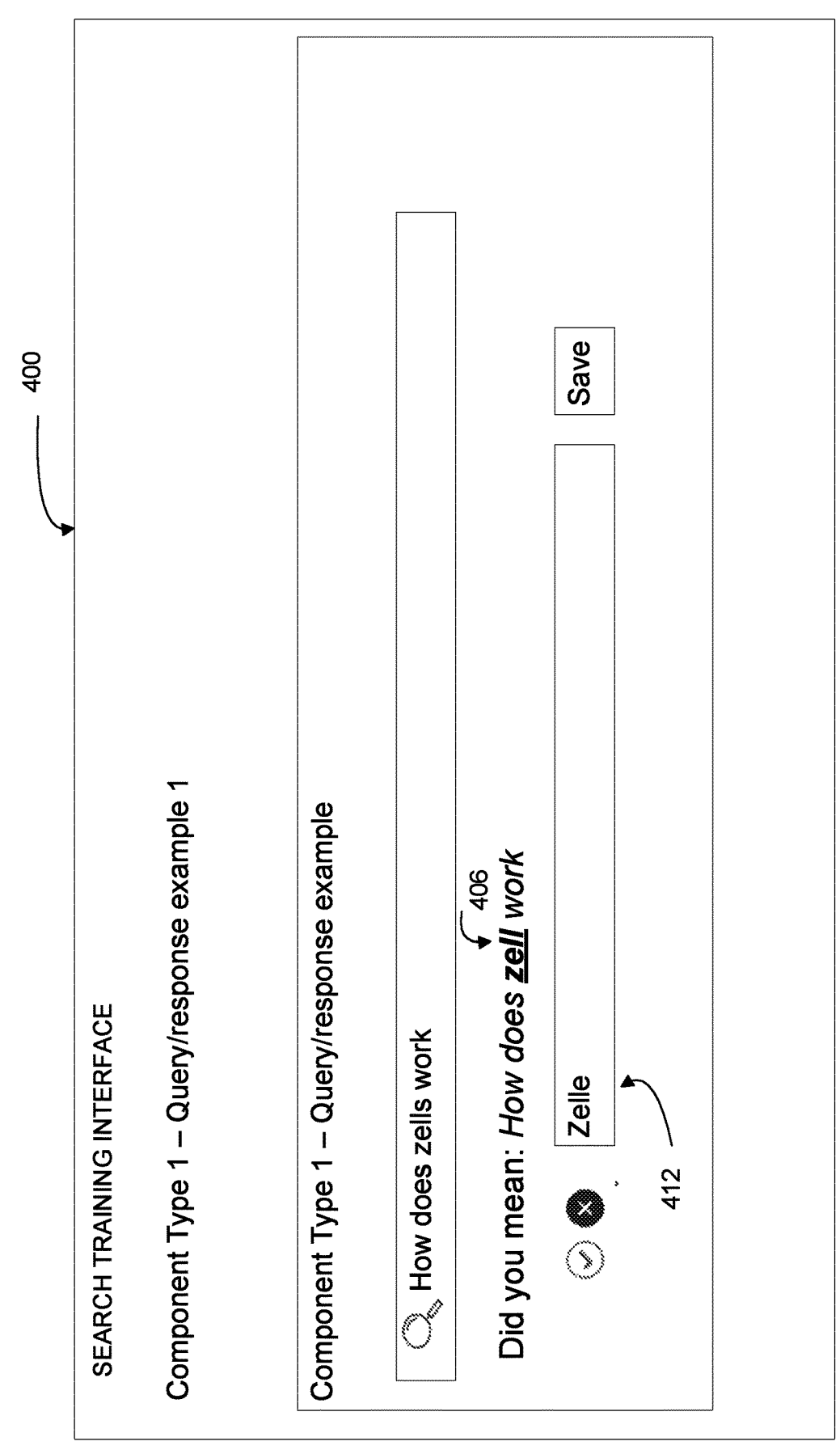

In an embodiment, selection of the revise label 312 indicates that the merchant system rejects the spell check response (e.g., correcting the term "zells" to "zell") and provides a revised response to be used in training the spell check component of the search algorithm. FIG. 4 illustrates an example training interface 400 generated by the processing logic in response to receiving a revise label from the merchant system. As shown in FIG. 4, the training interface 400 includes a field to enable the merchant system to submit a revision associated with the query response 406. In the example shown, the merchant system can identify that "zell" is not the desired spell correction for "zells" and enable the merchant system to indicate that the desired corrected spelling is "zelle". In an embodiment, the revision inputted by the merchant system can be saved and stored for use as feedback to train one or more models associated with the spell check component of the search algorithm.

In an embodiment, in the proactive mode, the processing logic can generate the second interface type to enable the merchant user to provide one or more labels regarding the component-level prediction (e.g., query response) for a query, thereby generating a new training event that can be included and tracked via the training log (e.g., as described above in connection with FIG. 5). In addition, reject labels and revise labels received and processed via the second interface type can be used by the training configuration resource generator to generate corresponding training configuration resources, as described below.

In operation 230, the processing device generates an override action in view of the label. In an embodiment, in response to receiving a rejection label or revise label, the processing logic identifies and stores a corresponding override action (e.g., an action indicating that the query response generated by the search algorithm component in response to a query is to be overridden during a subsequent processing of the query (e.g., a subsequent submission of the query by an end-user system). In an embodiment, in response to an accept label, the processing logic can generate an override action which indicates that an override is "not applicable" or "none" for tracking purposes to reflect that the training exercise confirmed the component-generated response was accepted by the merchant system.

In an embodiment, for each training event processed by the search algorithm management system (e.g., as described with respect to operations 210-230 of FIG. 2), the processing logic generates a corresponding training configuration resource. As shown in FIG. 6, a training configuration resource generator 614 is configured to process information relating to each training event 650 (e.g., training event 1, training event 2 . . . training event N) to generate a corresponding training configuration resource 660 (e.g., training configuration resource 1, training configuration resource 2 . . . training configuration resource N). In an embodiment, the training configuration resource (e.g., a file) corresponding to the information relating to each training event (e.g., a search query, response, and feedback (e.g., label) corresponding to a component of the search algorithm). For example, in an embodiment, in response to each instance where a merchant system provides a label (e.g., provides an indication corresponding to a thumbs up icon or other expression of the desired label), a new training configuration resource is generated.

In an embodiment, the training configuration resource generator can generate a resource in accordance with a schema to structure the data or information relating to each training event or example processed by the search algorithm management system 100. In an embodiment, each training configuration resource identifies the label (e.g., merchant user feedback) for an individual component of the search algorithm on an individual query.

In an embodiment, a single schema may be employed in connection with training events corresponding to the multiple different search algorithm components. FIG. 7 illustrates an example of a portion 700 of a training configuration resource including an example schema. The example shown in FIG. 7 represent the training configuration resource corresponding to the processing of a query including a search term "TERM 1" 702 as processed by a spell check component 704 of the search algorithm to generate a response 706. As shown in FIG. 7, the response 706 generated by the spell check component is "TERM 2", which indicates that "TERM 1" of the query is to be changed or corrected to "TERM 2". In this example, the portion of the training configuration resource 700 indicates that the merchant system provided a "reject" label 708 indicated that the spell check correction generated by the spell check component was rejected. In an embodiment, based on the "reject" label 708, the training configuration resource 700 can be associated with an override action which indicates that when a subsequent query including "TERM 1" is received, the spell check component of the search algorithm is configured not to present the response "TERM 2" as a spell correction.

In an embodiment, the training configuration resource 700 can include a "triggertype" field 710 which indicates a scope of the training event. In this example, the triggertype is "segment", which indicates that this training event applies to all search terms that contain the term "TERM 1". Accordingly, the training configuration resource 700 is scoped to the particular search term or word (e.g., TERM 1), and not the entire query string of the initial query.

In an embodiment (not shown), the training configuration resource may include information associated with a revision (e.g., "TERM 3") provided by the merchant system in connection with the training event (e.g., in response to the provisioning of a "revise" label). In this embodiment, the training configuration resource can be used to train the spell check component of the search algorithm to present the revision (e.g., TERM 3) provided by the merchant system as a spell check correction in response to a subsequent query including TERM 1 as a search term.

With reference to FIG. 2, in operation 240, the processing logic generates, in response to a second query comprising the one or more terms, a query response in accordance with the override action. In an embodiment, as a consequence of the training event corresponding to operations 210-230, the processing logic can train the corresponding component of the search algorithm such that an appropriate action is taken in response to a subsequent query including the one or more search terms. For example, a training event including a revise label is associated with an override action indicating that the component-generated response is to be override and replaced with the revision provided during the training event. In another example, a training event including a reject label is associated with an override action indicating that the component-generated response is to be overridden and blocked from provisioning as a response to the subsequent query.

According to embodiments, the search algorithm management system can manage the training corresponding to multiple different components, beyond the examples described in detail herein. In an embodiment, the search algorithm and deep learning and/or neural networks associated with the search algorithm can generate a need for additional training data and training examples associated with one or more other components of the search algorithm. For example, the search algorithm management system can manage a locale or location component of the search algorithm which relates to location information associated with a merchant. In an embodiment, the search algorithm can employ a language representation model (e.g., a Bidirectional Encoder Representations from Transformers (BERT)) associated location detection functionality relating to search queries and merchant data.

In an embodiment, the search algorithm management system can be configured to include a component (referred to as an "extractive question and answer" component) that searches one or more documents (e.g., collections of words and sentences) and mines the document for one or more answers to an end-user's query (e.g., a question) relating to the merchant. In an embodiment, the extractive question and answer component can be trained in accordance with the techniques and methods described in detail above.

Figure 9:
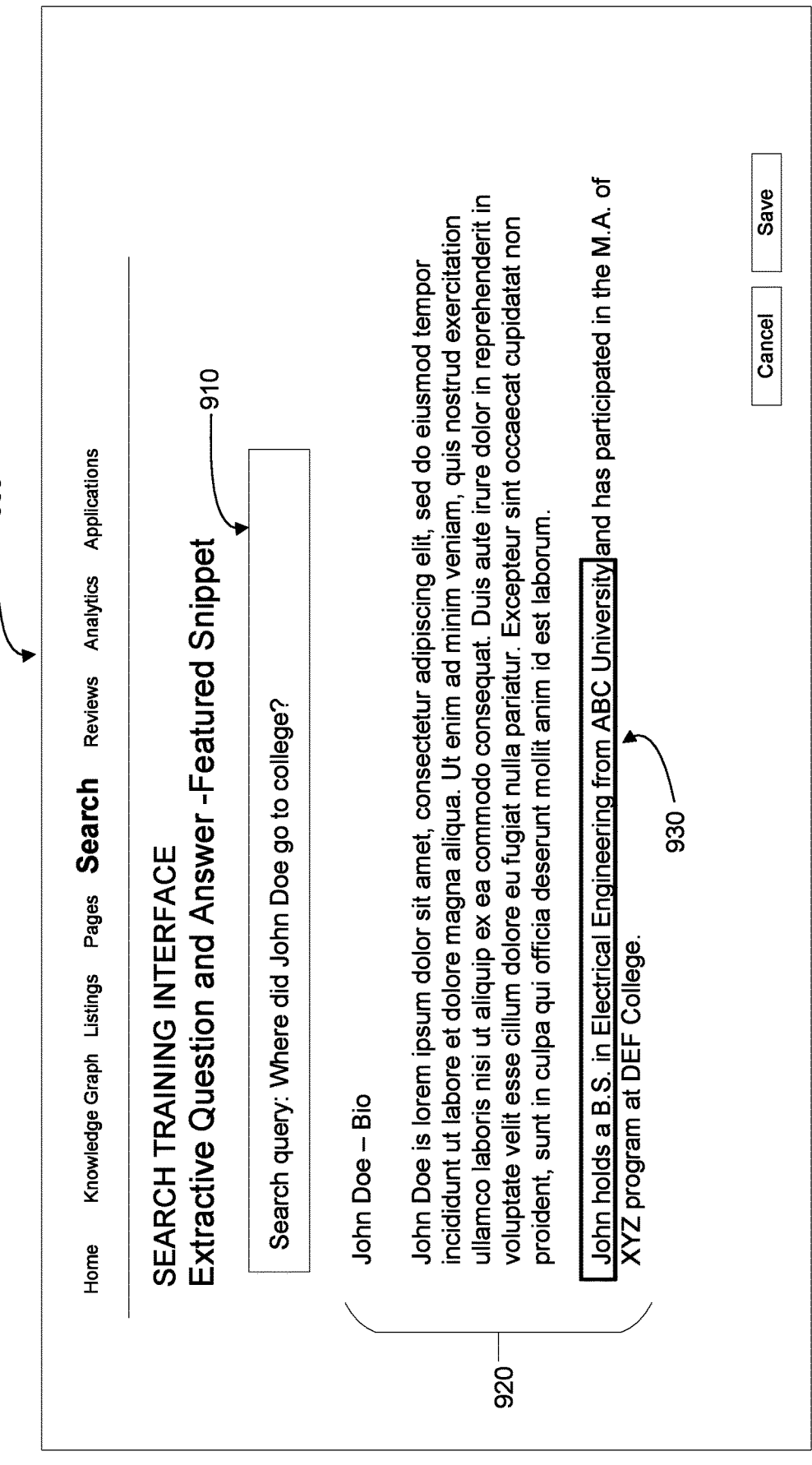
FIG. 9 illustrates an example interface configured to capture training feedback associated with an extractive question and answer component, according to embodiments of the present disclosure.

FIG. 9 illustrates an example interface configured to capture training feedback associated with an extractive question and answer component. As shown in FIG. 9, a search query (e.g., "where did John Doe go to college?") 910 and a corresponding "answer" or featured snippet 920 that is extracted from an unstructured document in response to the search query 910. In an embodiment, the interface 900 can enable a user to identify or highlight a portion 930 of the extracted answer 920. In an embodiment, the highlighted portion 930 identifies the one or more words from the extracted answer 920 of the unstructured document that represent a "best" or optimal answer to the particular search query. In an embodiment, the highlighted portion 930 is received as a training input to enable the search algorithm to produce this portion 930 of the unstructured document as part of a featured snippet in response to the search query 910. In an embodiment, if as part of the training example the user does not highlight a particular word or portion of the extracted answer 920 (or affirmatively selects a "no" or "nothing" option in connection with the extracted answer 920, the corresponding search algorithm component can be trained not to produce a featured snippet in response to this particular search query.

In an embodiment, the search algorithm management system can be configured to include a component (referred to as a "semantic search" component) that maps or associates a frequently asked question (FAQ) and a search query.

In an embodiment, the search algorithm management system can process training events (e.g., training examples) to enable the merchant system to identify one or more FAQs that are relevant to a search query. The feedback regarding the FAQ to search query mapping can be used to train a semantic search component of the search algorithm in accordance with the techniques and methods described in detail above.

Figure 10:
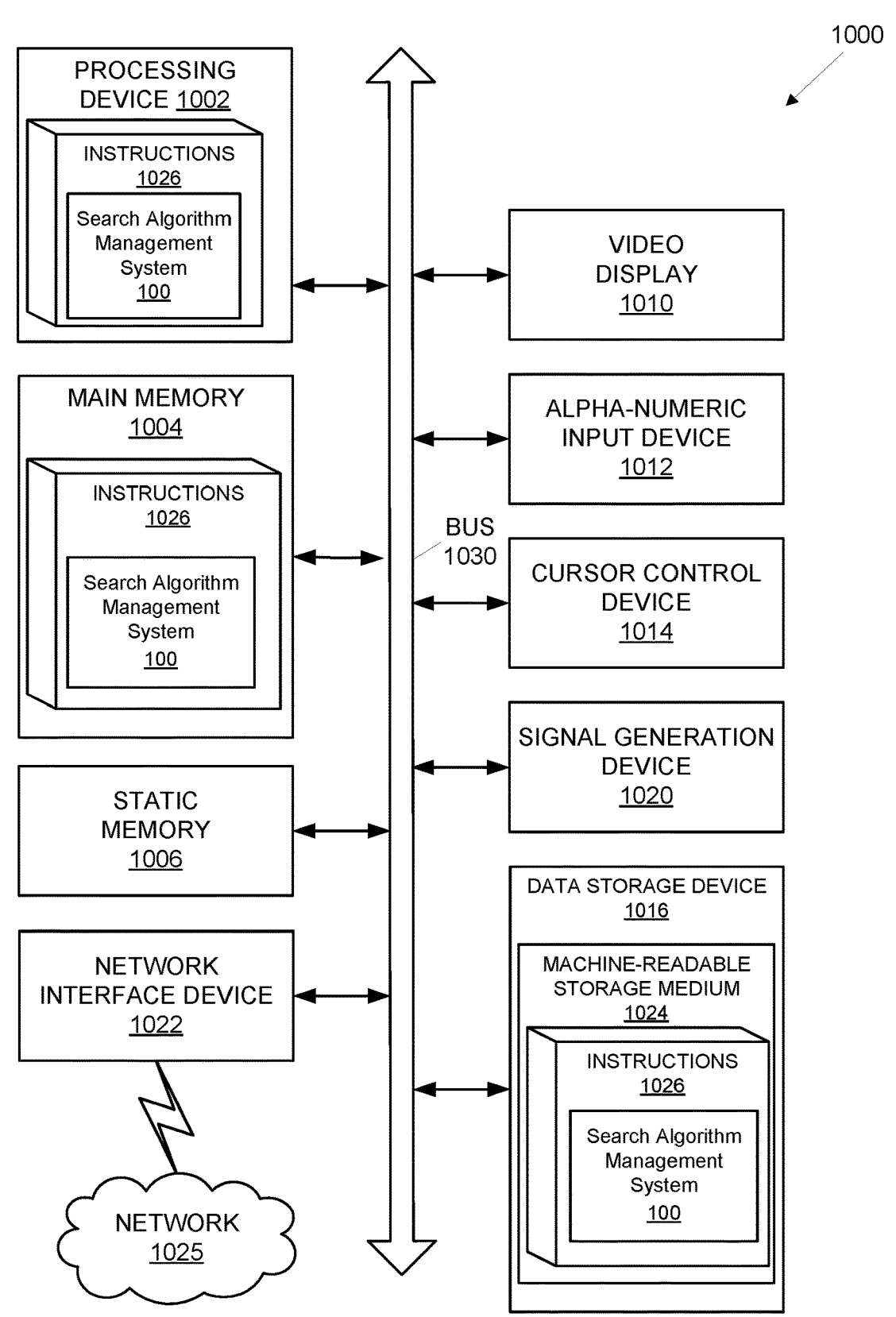
FIG. 10 is a block diagram of an example computer system in which implementations of the present disclosure can operate.

FIG. 10 illustrates an example computer system 1000 operating in accordance with some embodiments of the disclosure. In FIG. 10, a diagrammatic representation of a machine is shown in the exemplary form of the computer system 1000 within which a set of instructions, for causing the machine to perform any one or more of the methodologies discussed herein, may be executed. In alternative embodiments, the machine 1000 may be connected (e.g., networked) to other machines in a local area network (LAN), an intranet, an extranet, or the Internet. The machine 1000 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 1000. Further, while only a single machine is illustrated, the term "machine" shall also be taken to include any collection of machines that individually or jointly execute a set (or multiple sets) of instructions to perform any one or more of the methodologies discussed herein.

The example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1016), which may communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute a search algorithm management system 100 for performing the operations and steps discussed herein. For example, the processing device 1002 may be configured to execute instructions implementing the processes and methods described herein, for supporting a search algorithm management system 100, in accordance with one or more aspects of the disclosure.

Example computer system 1000 may further comprise a network interface device 1022 that may be communicatively coupled to a network 1025. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1020 (e.g., a speaker).

Data storage device 1016 may include a computer-readable storage medium (or more specifically a non-transitory computer-readable storage medium) 1024 on which is stored one or more sets of executable instructions 1026. In accordance with one or more aspects of the disclosure, executable instructions 1026 may comprise executable instructions encoding various functions of the search algorithm management system 100 in accordance with one or more aspects of the disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1022.

While computer-readable storage medium 1024 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "using," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, at a computer system at a first time, a first search query from a user;
   generating, via at least one processor of the computer system executing a search algorithm, a first query response comprising a first sub response and a second sub response in response to the first search query, wherein the first sub response is generated by a first component of the search algorithm and the second sub response is generated by a second component of the search algorithm;
   receiving, at the computer system from the user, a first and a second feedback each corresponding to the first and the second sub response;
   associating, via the at least one processor, each of the first and the second feedback with the first and the second component of the search algorithm;
   generating, via the at least one processor in response to the first and the second feedback, an override action corresponding to at least one of the first component and the second component and with one or more terms of the first search query, the override action indicating that a second query response generated by the corresponding at least one of the first component and the second component in response to a second search query including the one or more terms is to be overridden;
   storing, via the at least one processor, the override action in a data store comprising an override cache;
   training, via the at least one processor executing a machine learning algorithm using the first and the second feedback as input, a model associated with the first component and the second component, wherein the training of the first component is based on the first feedback corresponding to the first sub response and the training of the second component is based on the second feedback corresponding to the second sub response;
   modifying, via the at least one processor using the model, the search algorithm such that the first and the second component are updated, resulting in a modified search algorithm;
   receiving, at the computer system at a second time which is distinct from the first time, the second search query comprising the one or more terms of the first search query, the second search query being equivalent to the first search query; and
   generating, via at least one processor of the computer system executing the modified search algorithm and in accordance with the override action, the second query response in response to the second search query, the second query response being distinct from the first query response.

2. The method of claim 1, wherein the first feedback comprises one of an accept label, a rejection label, an override label, or a revise label.

3. The method of claim 1, wherein the first component of the search algorithm comprises a portion of the search algorithm configured to perform a filter function of the search algorithm.

4. The method of claim 1, wherein the first component comprises a natural language processing (NLP) filter component configured to perform NLP filtering associated with the first search query.

5. The method of claim 1, the first feedback comprises a revise label.

6. The method of claim 1, wherein the second search query is identical to the first search query.

7. A system comprising:
   at least one processor; and
   a non-transitory computer-readable storage medium having instructions stored which, when executed by the at least one processor, cause the at least one processor to perform operations comprising:
   receiving, at a first time, a first search query from a user;
   generating, by executing a search algorithm, a first query response comprising a first sub response and a second sub response in response to the first search query, wherein the first sub response is generated by a first component of the search algorithm and the second sub response is generated by a second component of the search algorithm;
   receiving, from the user, a first and a second feedback each corresponding to the first query response;
   associating each of the first and the second feedback with the first and the second component of the search algorithm;
   generating, via the at least one processor in response to the first and the second feedback, an override action corresponding to at least one of the first component and the second component and with one or more terms of the first search query, the override action indicating that a second query response generated by the corresponding at least one of the first component and the second component in response to a second search query including the one or more terms is to be overridden;
   storing, via the at least one processor, the override action in a data store comprising an override cache;

training, by executing a machine learning algorithm using the first and the second feedback as input, a model associated with the first and the second component, wherein the training of the first component is based on the first feedback corresponding to the first sub response and the training of the second component is based on the second feedback corresponding to the second sub response;

modifying, using the model, the search algorithm such that the first and the second component are updated, resulting in a modified search algorithm;

receiving, at a second time which is distinct from the first time, the second search query comprising the one or more terms of the first search query, the second search query being equivalent to the first search query; and generating, by executing the modified search algorithm and in accordance with the override action, the second query response in response to the second search query, the second query response being distinct from the first query response.

8. A non-transitory computer readable storage medium having instructions stored that, when executed by a processing device, cause the processing device to perform operations comprising:

receiving, at a first time, a first search query from a user;

generating, by executing a search algorithm, a first query response comprising a first sub response and a second sub response in response to the first search query, wherein the first sub response is generated by a first component of the search algorithm and the second sub response is generated by a second component of the search algorithm;

receiving, from the user, a first and a second feedback each corresponding to the first and the second sub response;

associating each of the first and the second feedback with the first component and the second component of the search algorithm;

generating, via the at least one processor in response to the first and the second feedback, an override action corresponding to at least one of the first component and the second component and with one or more terms of the first search query, the override action indicating that a second query response generated by the corresponding at least one of the first component and the second component in response to a second search query including the one or more terms is to be overridden;

storing, via the at least one processor, the override action in a data store comprising an override cache;

training, by executing a machine learning algorithm using the first and the second feedback as input, a model associated with the and the second component, wherein the training of the first component is based on the first feedback corresponding to the first sub response and the training of the second component is based on the second feedback corresponding to the second sub response;

modifying, using the model, the search algorithm such that the first and the second component are updated, resulting in a modified search algorithm;

receiving, at a second time which is distinct from the first time, the second search query comprising the one or more terms of the first search query, the second search query being equivalent to the first search query; and generating, by executing the modified search algorithm and in accordance with the override action, the second query response in response to the second search query, the second query response being distinct from the first query response.

9. The non-transitory computer readable storage medium of claim 8 wherein the first feedback comprises one of an accept label, a rejection label, an override label, or a revise label.

10. The non-transitory computer readable storage medium of claim 8, wherein the first component of the search algorithm comprises a portion of the search algorithm configured to perform a filter function of the search algorithm.

11. The non-transitory computer readable storage medium of claim 8, wherein the first component comprises a natural language processing (NLP) filter component configured to perform NLP filtering.

12. The non-transitory computer readable storage medium of claim 8, wherein the first feedback comprises a revise label.

* * * * *